(12) United States Patent
Alakarhu

(10) Patent No.: US 8,970,738 B2
(45) Date of Patent: Mar. 3, 2015

(54) ARRANGEMENT FOR MACRO PHOTOGRAPHY

(75) Inventor: Juha Alakarhu, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 14/129,314

(22) PCT Filed: Jun. 30, 2011

(86) PCT No.: PCT/FI2011/050619
§ 371 (c)(1),
(2), (4) Date: Dec. 26, 2013

(87) PCT Pub. No.: WO2013/001137
PCT Pub. Date: Jan. 3, 2013

(65) Prior Publication Data
US 2014/0125846 A1 May 8, 2014

(51) Int. Cl.
*H04N 5/262* (2006.01)
*H04N 5/232* (2006.01)
*G02B 7/10* (2006.01)
*G03B 17/00* (2006.01)
*G03B 13/20* (2006.01)

(52) U.S. Cl.
CPC ............ *H04N 5/23296* (2013.01); *G02B 7/102* (2013.01); *G03B 13/20* (2013.01)
USPC ...................... 348/240.99; 348/240.1; 396/87

(58) Field of Classification Search
USPC ........... 348/240.99, 240.1–240.3; 396/76–77, 396/79, 85–88
See application file for complete search history.

(56) References Cited

U.S. PATENT DOCUMENTS

| | | | |
|---|---|---|---|
| 4,078,857 A | 3/1978 | Kantner et al. | 350/187 |
| 4,191,460 A | 3/1980 | Fujiki | 354/25 |
| 4,928,124 A | 5/1990 | Taniguchi et al. | 354/106 |
| 4,970,537 A | 11/1990 | Tsuboi | 354/126 |
| 5,204,710 A | 4/1993 | Tsukamoto et al. | 354/402 |
| 5,227,831 A | 7/1993 | Miyazaki et al. | 354/402 |
| 5,235,374 A | 8/1993 | Kobayashi et al. | 354/400 |
| 5,604,562 A | 2/1997 | Aoyama | 396/79 |
| 2007/0140678 A1 | 6/2007 | Yost et al. | 396/147 |
| 2007/0296845 A1* | 12/2007 | Watanabe et al. | 348/333.12 |
| 2010/0208123 A1* | 8/2010 | Akagi et al. | 348/333.12 |
| 2011/0050945 A1* | 3/2011 | Konno | 348/222.1 |
| 2011/0292235 A1* | 12/2011 | Takada et al. | 348/222.1 |

FOREIGN PATENT DOCUMENTS

JP 62 136630 6/1987

* cited by examiner

*Primary Examiner* — Kelly L Jerabek
(74) *Attorney, Agent, or Firm* — Harrington & Smith

(57) ABSTRACT

An apparatus for capturing images. The apparatus includes a camera unit configured to capture images of target objects, and a processing unit configured to control the apparatus to detect close-up photography conditions, and to automatically zoom said camera unit in response to said detection.

15 Claims, 3 Drawing Sheets

ARRANGEMENT FOR MACRO PHOTOGRAPHY

TECHNICAL FIELD

The present application relates generally to photography and more specifically to an arrangement for macro photography.

BACKGROUND

Macro photography relates to photography of close-up objects, often of rather small size.

SUMMARY

Various aspects of examples of the invention are set out in the claims.

According to a first aspect of the invention there is provided an apparatus comprising
- a camera unit configured to capture images of target objects, and
- a processing unit configured to control the apparatus
- to detect close-up photography conditions, and
- in response to said detection to automatically zoom said camera unit.

According to a second aspect of the invention there is provided a method comprising
- capturing images of target objects with a camera unit,
- detecting close-up photography conditions, and
- in response to said detection, automatically zooming said camera unit.

According to a third aspect of the invention there is provided a computer program embodied on a computer readable medium comprising computer executable program code which, when executed by at least one processor of an apparatus, causes the apparatus to perform:
- capturing images of target objects with a camera unit,
- detecting close-up photography conditions, and
- in response to said detection, automatically zooming said camera unit.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1A:
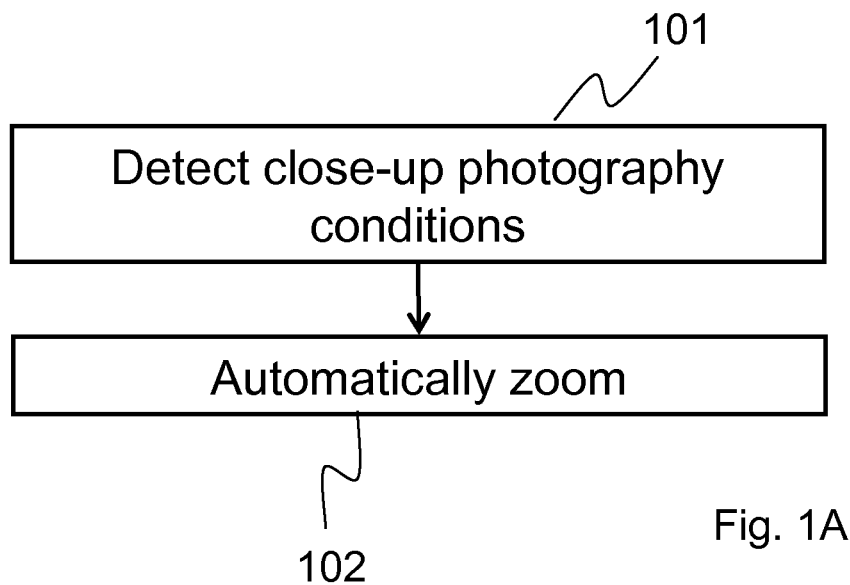
FIG. 1A shows a flow diagram of method according to an embodiment of the invention.

Example embodiments of the present invention and their potential advantages are understood by referring to FIGS. 1A through 3 of the drawings. In the following description, like numbers denote like elements.

A camera according to an example embodiment of the invention provides a macro photography functionality, wherein the camera starts to automatically increase the zoom ratio of the camera, when the user of the camera moves the camera close to a target object. In an example embodiment, the camera operates normally without automatic zooming until certain threshold distance is reached between the camera and the target object and then starts to gradually increase the zoom when the camera is moved closer to the target object.

In an example embodiment of the invention there is provided an apparatus that comprises a camera unit that is configured to capture images of target objects and a processing unit configured to control operation of the apparatus. The processor controls the apparatus to detect close-up photography conditions and to automatically zoom the camera unit in response to the detection of close-up photography conditions.

In an example embodiment, the processor is configured to control the apparatus to perform the zooming by automatically increasing a zoom factor or a zoom ratio.

In an example embodiment the close-up photography conditions are detected on the basis of the apparatus being set to a macro photography mode. In an example embodiment the processor controls the zoom to go to a tele position (maximum zoom) when the apparatus is set to a macro photography mode. Instead of tele position some other increased zoom ratio may be predefined for the macro photography mode, that is, the zoom ratio that is used in the macro mode is not mandatorily the maximum zoom ratio.

In an example embodiment, the apparatus further comprises a distance estimation unit configured to observe distance to a target object, and the processor controls the apparatus to detect the close-up photography conditions by detecting that observed distance to the target object is smaller than a predefined threshold distance.

If the camera unit has continuous autofocus functionality the distance estimation is already provided for the purposes of the continuous autofocus functionality. That is, a camera with a continuous autofocus functionality already knows the distance to the target object. Thereby an additional unit is not necessarily needed for the distance estimation.

In an example embodiment, the zoom ratio is gradually increased as distance to the target object decreases. From the user point of view, this creates an effect of an accelerated macro functionality as the target object seems to approach the camera at an accelerated speed.

In an example embodiment, the zoom ratio is increased up to a predefined optimal zoom ratio. In an example embodiment the optimal zoom ratio is maximum zoom ratio. In another example embodiment the optimal zoom ratio is near maximum zoom ratio.

In general in embodiments of the invention, the zoom ratio is increased for close-up photography. It must be noted though that if the zoom ratio is already at maximum or if at least some zooming is used, when close-up photography conditions are detected, in an embodiment of the invention the zoom ratio is not adjusted at all. It is however possible to make some adjustments to the zoom ratio so that optimal zoom for macro photography is used. The adjustments that are conducted may depend on the zoom ratio at the time of detecting the close-up photography conditions.

In an example embodiment the camera unit is configured to enable full focusing range at any zoom ratio. The camera unit may use digital zoom or optical zoom or a combination of digital and optical zoom.

Certain optical zoom cameras enable full focusing range at any zoom ratio. For example: user can capture images from 10 cm to infinity at any zoom ratio, instead of having, e.g. 10 cm-to-infinity range at wide position (minimum zoom) and only 30 cm-to-infinity range at tele position (maximum zoom). Therefore, with optics that enable full focusing range at any zoom ratio it is possible to capture close-up photographs at tele position and the best magnification for close-up photographs can be achieved at tele position. Thereby improved macro performance is achieved.

Users however shoot most photographs at wide position (minimum zoom) and it is likely that users do not intuitively use tele position for macro photography. By means of embodiments of the invention, the tele position or otherwise increased zoom ratio is automatically provided for macro photography and thereby user experience can be improved.

Furthermore, even if the user would understand that the best macro shots can be achieved at the tele position, putting the camera to the tele position for macro shots would require an extra action from the user and therefore would make spontaneous shots more difficult. Thus embodiments of the invention that automate this step improve the user experience also in this case.

An advantage of zoom that enables full focusing range is that the zoom ratio can be controlled digitally, without any time delays, which makes it easy to control the zoom ratio according to embodiments of the invention.

In an example embodiment, the users are provided with a possibility to manually override the use of automatic zooming according to embodiments of the invention. That is, the user can set the apparatus into a mode in which the automatic zooming is not performed. In this way the users obtain improved control over functionality of the apparatus and may decide themselves if they want to take advantage of the features of embodiments of the invention or not.

FIG. 1A shows a rough flow diagram illustrating a method in accordance with an embodiment of the invention.

In phase 101, close-up photography or macro photography conditions are detected. In response to the detecting of close-up photography conditions, the apparatus starts to automatically zoom in phase 102.

Figure 1B:
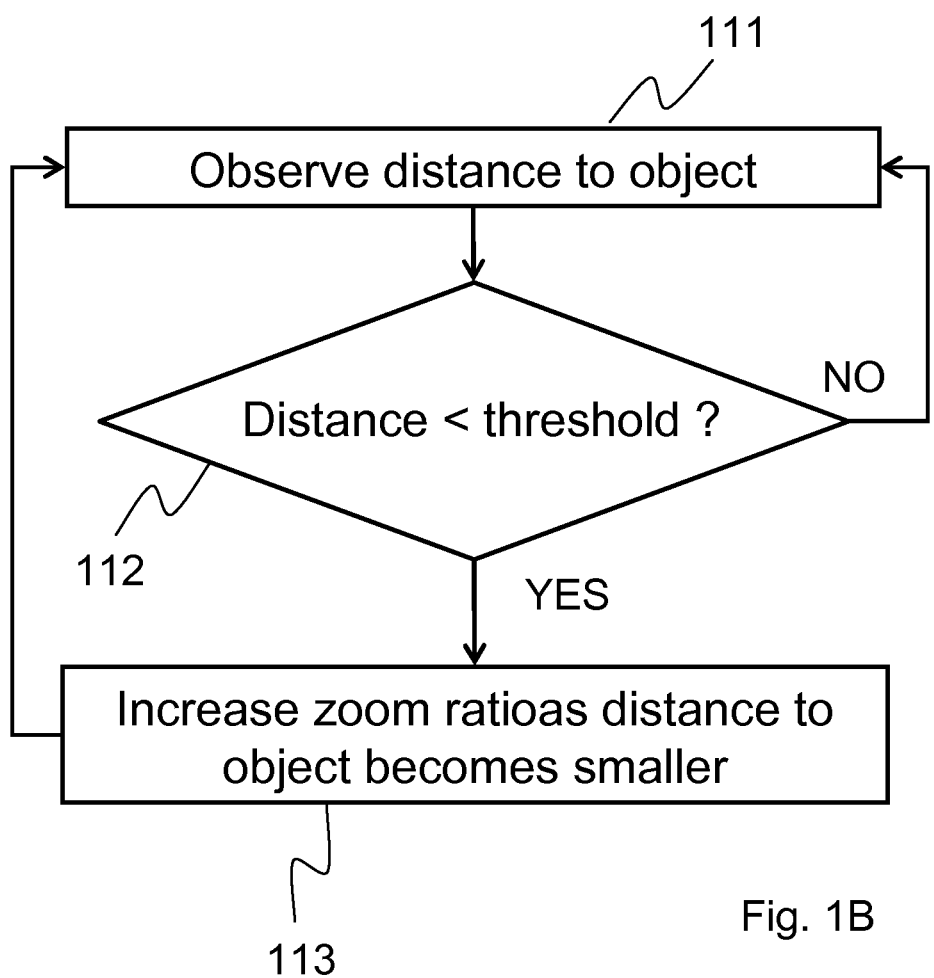
FIG. 1B shows a flow diagram of method according to an embodiment of the invention.

FIG. 1B shows a rough flow diagram illustrating a method in accordance with an embodiment of the invention.

In phase 111, distance to a target object is observed.

In phase 112, the observed distance is compared to a threshold distance. If the observed distance is larger than the threshold distance, the procedure returns to phase 111 and continues to observe the distance to the target object. In an example embodiment the threshold distance is 50 cm. In another example embodiment the threshold distance is 20 cm. In yet another example embodiment the threshold distance is 70 cm. Also other threshold values can be used.

If the observed distance is smaller than the threshold distance, it is concluded that close-up photography conditions are fulfilled and the procedure moves to phase 113 and starts to increase zoom ratio as distance to the target object decreases. In an example embodiment, the zoom ratio is gradually increased. In an example embodiment, the zoom ratio is stepwise increased. In an example embodiment, the zoom ratio is linearly increased.

Figure 2:
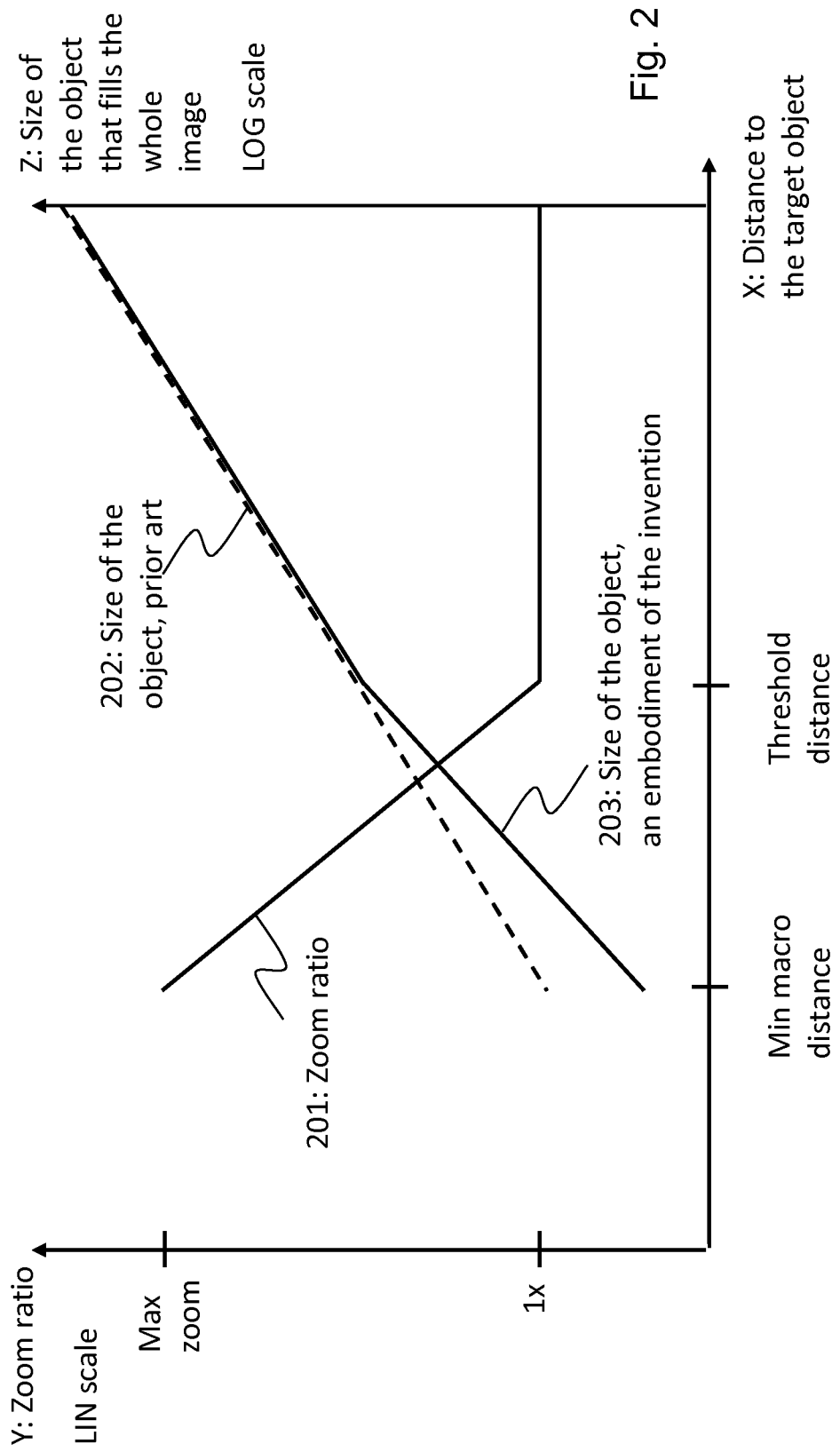
FIG. 2 shows a graph illustrating operation of an embodiment of the invention.

FIG. 2 shows a graph illustrating operation of an embodiment of the invention.

X-axis illustrates distance to a target object, Y-axis illustrates a zoom ratio in linear scale and Z-axis illustrates size of the object that fills the whole image in logarithmic scale. The smaller the size of the object in the Z-axis is, the better macro performance is achieved.

Dashed line 202 shows size of the object that fills the whole image as a function of the distance to the object in a prior art solution.

Solid lines 201 and 203 illustrate operation of an embodiment of the invention. When the distance to the target object is larger than a threshold value, the zoom ratio (line 201) is 1×, that is, there is no zoom. When the distance to the target object is below the threshold value, the zoom ratio is gradually increased to a maximum value, which may be e.g. 3× so that when the distance to the target object is reduced to the minimum of the focusing range, the zoom ratio is set to its maximum. Line 203 shows that when the distance to the target object is larger than a threshold value, the performance (size of the object that fills the whole image) is similar to the performance of the prior art solution. When the distance to the target object is below the threshold value, the performance is improved in comparison to the prior art performance illustrated by line 202.

Figure 3:
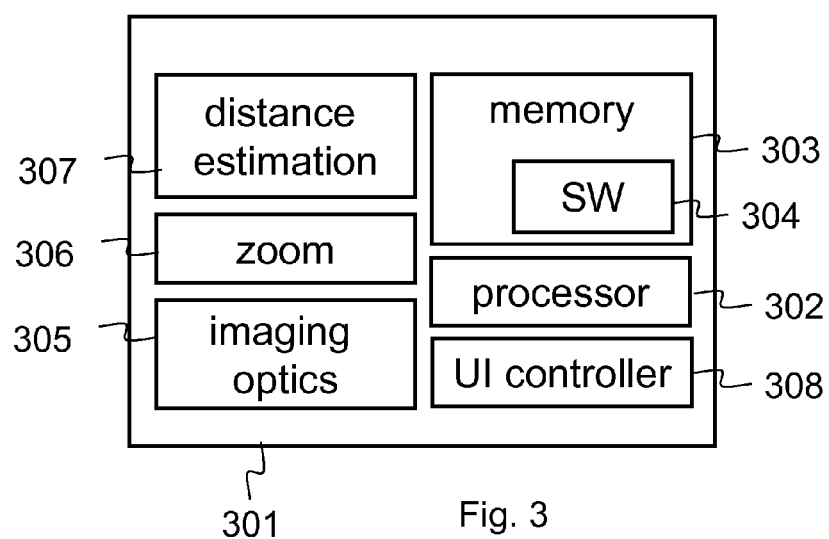
FIG. 3 shows a block diagram of an apparatus according to an embodiment of the invention.

FIG. 3 shows a block diagram of an apparatus 301 according to an embodiment of the invention.

The general structure of the apparatus 301 comprises a processor 302 and a memory 303 coupled to the processor 302. The apparatus further comprises software 304 stored in the memory 303 and operable to be loaded into and executed in the processor 302. The software 304 may comprise one or more software modules and can be in the form of a computer program product. The apparatus 301 further comprises a user interface controller 308 coupled to the processor 302 and may include also a rechargeable battery for powering up the apparatus 301.

Additionally the apparatus 301 may comprise a communication interface module coupled to the processor 302. Such communication interface module may be, e.g., a radio interface module, such as a WLAN, Bluetooth, GSM/GPRS, CDMA, WCDMA, LTE (Long Term Evolution), LPRF, or wifi radio module. Such communication interface module may support one radio interface technology or a plurality of technologies and there may be one or more of these modules.

The processor 302 may be, e.g., a central processing unit (CPU), a microprocessor, a digital signal processor (DSP), a graphics processing unit, an application specific integrated circuit (ASIC), a field programmable gate array, a microcontroller or a combination of such elements. The apparatus 301 may comprise a plurality of processors.

The memory 303 may be for example a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 301 may comprise a plurality of memories.

The user interface controller 308 may comprise circuitry for receiving input from a user of the apparatus 301, e.g., via a keyboard, graphical user interface, speech recognition circuitry, or an accessory device, such as a headset, and for providing output to the user via, e.g., a graphical user interface or a loudspeaker.

Further the apparatus 301 comprises imaging optics 305, zoom control unit 306 and a distance estimation unit 307 configured for capturing images and controlling the capturing of the images.

The distance estimation unit 307 is configured to observe distance to a target object and to provide this information for use in other elements of the apparatus 301.

The imaging optics 305 may operate according to instructions given by the processor 302 and/or according to instructions received through the user interface controller 308 and/or based on information received from the distance estimation unit 307.

The zoom control unit 306 may operate according to information received from the distance estimation unit 307 and/or instructions given by the processor 302.

Without in any way limiting the scope, interpretation, or application of the claims appearing below, certain technical effects of one or more of the example embodiments disclosed herein are listed in the following: A technical effect is easy to use functionality. The automatically accelerated macro mode does not necessarily require any additional action from the user. Another technical effect is automatically improved macro photography performance. Yet another technical effect is possibility to utilize the full potential of cameras' macro performance.

Still another technical effect is that the minimum focusing distance of the camera optics can be larger than before without deteriorating good macro performance. For example, minimum focusing distance of 15 cm can be used instead of minimum focusing distance of 10 cm. The use of the tele position in close-up photography compensates the difference in the minimum focusing distance and thereby the macro performance is not deteriorated even though the minimum focusing distance is larger.

From this it follows that a smaller camera module sizes can be achieved. For example supporting very close focus, such as 10 cm, increases the camera module height in cameras that enable full focusing range at any zoom ratio. Therefore it is advantageous to be able to use a camera module with minimum focusing distance of 15 cm, for example.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

If desired, the different functions discussed herein may be performed in a different order and/or concurrently with each other. Furthermore, if desired, one or more of the above-described functions may be optional.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus, comprising:
    a camera unit configured to capture images of target objects, and
    a processor configured to control the apparatus:
        to detect close-up photography conditions,
        in response to said detection to automatically zoom said camera unit, and
        to gradually increase a zoom ratio as distance to the target object decreases.

2. An apparatus of claim 1, wherein the processor is configured to control the apparatus
    to perform said zooming by automatically increasing the zoom ratio.

3. An apparatus of claim 1, wherein the apparatus further comprises:
    a distance estimation unit configured to observe distance to a target object, and wherein the processor is further configured to control the apparatus
    to detect the close-up photography conditions by detecting that observed distance to the target object is smaller than a predefined threshold distance.

4. An apparatus of claim 3, wherein the processor is further configured to control the apparatus
    to increase the zoom ratio up to a predefined optimal zoom ratio.

5. An apparatus of claim 1, wherein the processor is further configured to control the apparatus
    to increase the zoom ratio up to a predefined optimal zoom ratio.

6. An apparatus of claim 5, wherein said optimal zoom ratio is maximum zoom ratio.

7. An apparatus of claim 1, wherein the camera unit is configured to enable full focusing range at any zoom ratio.

8. An apparatus of claim 1, wherein the camera unit comprises optical zoom.

9. An apparatus of claim 1, wherein the camera unit comprises digital zoom.

10. A method, comprising:
    capturing images of target objects with a camera unit,
    detecting close-up photography conditions,
    in response to said detection, automatically zooming said camera unit, and
    gradually increasing a zoom ratio as distance to the target object decreases.

11. A method of claim 10, further comprising
    performing said zooming by automatically increasing the zoom ratio.

12. A method of claim 10, further comprising
    observing distance to a target object, and
    detecting the close-up photography conditions by detecting that observed distance to the target object is smaller than a predefined threshold distance.

13. A method of claim 10, further comprising
    increasing the zoom ratio up to a predefined optimal zoom ratio.

14. A method of claim 13, wherein said optimal zoom ratio is maximum zoom ratio.

15. A computer program embodied on a non-transitory computer readable medium comprising computer executable program code which, when executed by at least one processor of an apparatus, causes the apparatus to perform:
    capturing images of target objects with a camera unit,
    detecting close-up photography conditions,
    in response to said detection, automatically zooming said camera unit, and
    gradually increasing a zoom ratio as distance to the target object decreases.

* * * * *